No. 612,015. Patented Oct. 11, 1898.
C. C. CHESNEY.
LIGHTNING ARRESTER.
(Application filed Jan. 15, 1898.)
(No Model.) 2 Sheets—Sheet 1.
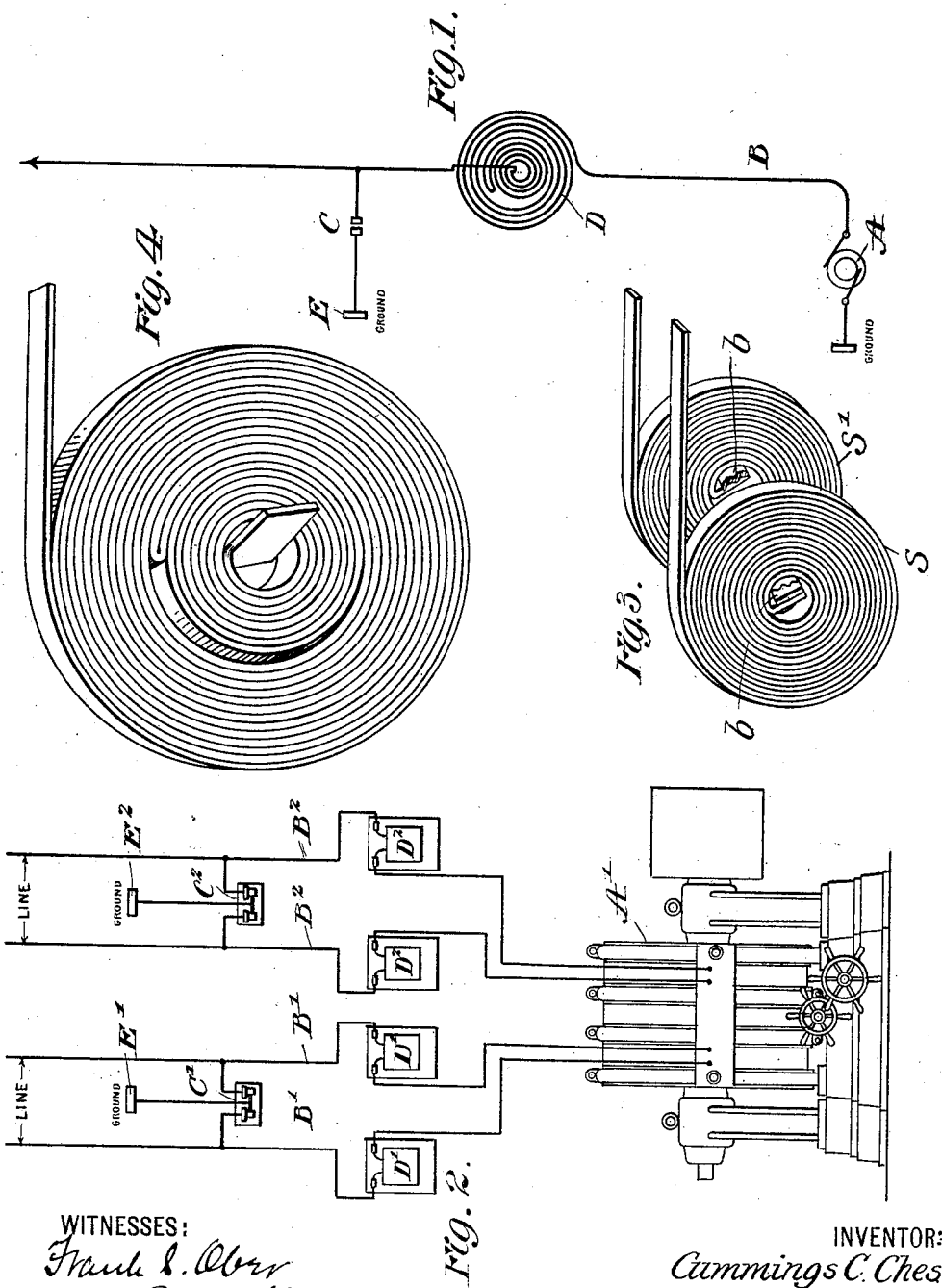
WITNESSES:
INVENTOR:
Cummings C. Chesney.
BY
H. R. Brownell.
ATTORNEY No. 612,015. Patented Oct. 11, 1898.
C. C. CHESNEY.
LIGHTNING ARRESTER.
(Application filed Jan. 15, 1898.)
(No Model.) 2 Sheets—Sheet 2.
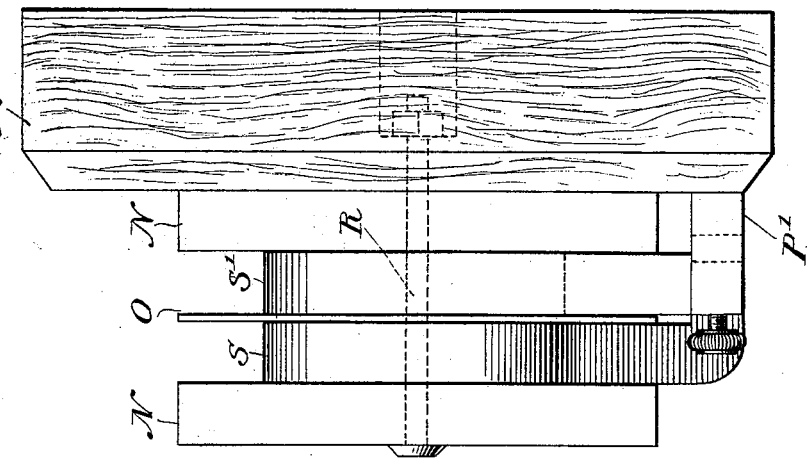
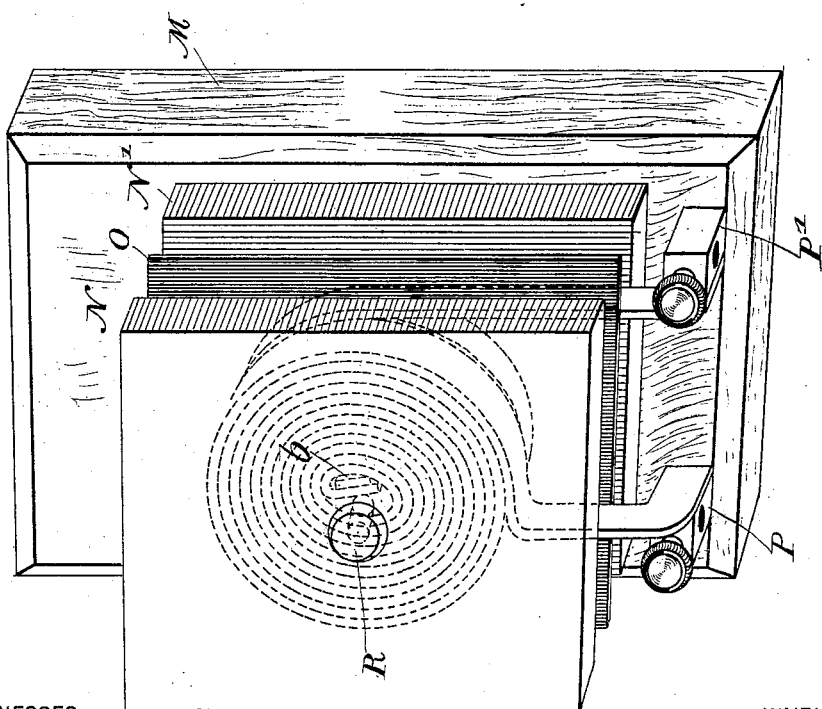
WITNESSES:
Frank S. Ober
J. B. Bassett
INVENTOR:—
Cummings C. Chesney.
BY
H. B. Brownell.
ATTORNEY

UNITED STATES PATENT OFFICE.

CUMMINGS C. CHESNEY, OF PITTSFIELD, MASSACHUSETTS, ASSIGNOR TO JOHN F. KELLY, OF SAME PLACE.

LIGHTNING-ARRESTER.

SPECIFICATION forming part of Letters Patent No. 612,015, dated October 11, 1898.

Application filed January 15, 1898. Serial No. 666,750. (No model.)

*To all whom it may concern:*

Be it known that I, CUMMINGS C. CHESNEY, a citizen of the United States, residing at Pittsfield, Berkshire county, State of Massachusetts, have invented certain new and useful Improvements in Lightning-Arresters, of which the following is a full, clear, and exact description.

My invention relates to that class of apparatus in which a reactive coil is combined with a lightning-arrester, the reactive coil being interposed in the circuit between the lightning-arrester and the apparatus to be protected, and has for its object to produce an effective apparatus that can be used advantageously in connection with systems of distribution employing alternating currents as well as with systems employing continuous currents.

The following is a description of an apparatus embodying my invention, reference being had to the accompanying drawings, in which—

Figure 1 represents diagrammatically a simple alternating-current system to which my invention is applied. Fig. 2 represents diagrammatically a system of two-phase distribution to which my invention is applied. Fig. 3 represents the reactive or choking coil in perspective. Fig. 4 represents a modified form of the reactive or choking coil. Figs. 5 and 6 are respectively perspective and side views of the apparatus as actually constructed.

In Fig. 1, representing diagrammatically a system of distribution of alternating electric currents, A is the apparatus to be protected. B is the line conductor. C is a lightning-arrester, one terminal of which is grounded at E in the ordinary manner. D is a choking-coil placed in the line between the lightning-arrester C and the apparatus A to be protected.

So far as the invention is concerned it is immaterial whether the apparatus to be protected is dynamo-electric apparatus, such as a generator or motor, or whether it is electrical apparatus of some other sort. The advantages of the apparatus are, however, greatest when it is used in an alternating-current system, for reasons hereinafter set forth.

In order that a choking-coil should act efficiently in connection with a lightning-arrester, it must offer as high an impedance as possible to the lightning discharge, so as to force it across the arrester-circuit and away from the apparatus to be protected. On the other hand, with alternating currents a high impedance, even though self-inductive, is very injurious, since a large self-induction in an alternating-current line lessens the output of the generator and impairs the regulation of the system. I, however, have discovered that coils made according to the following description, while possessing practically no self-induction with alternating currents of ordinary frequency, offer practically as high self-inductive impedance to extremely high frequency discharges, like those of lightning, as do plain coils, such as are now ordinarily used with lightning-arresters.

The reactive coil in my invention consists of parts so disposed relatively to one another that the coefficient of mutual induction is very high. Fig. 3 represents such a coil, which consists of two parallel coils of insulated copper strips connected in series and wound so that the current flows through them in opposite directions. These parts are placed near together side by side, with the result that the coefficient of mutual induction is very high, and in consequence with ordinary alternating currents the self-induction of the two coils is nearly zero. They thus constitute a composite coil which may be used in embodying my invention. As shown, the parts are separated a considerable distance, the connecting-bond being interrupted for that purpose. Fig. 4 also represents such a coil. In this coil the insulated strip is all wound in the same plane, being wound one half in one direction and the other half in the reverse direction. In this coil also the mutual induction is very high and the self-induction for ordinary alternating currents practically zero.

In embodying my invention, therefore, I place a coil, such as one of those above described, directly in the line between the lightning-arrester and the apparatus to be protected, with the result of providing a high impedance for lightning discharges and yet not interfering with the working of the system, whether it be alternating or continuous.

The fact that coils such as I have above described offer practically as great an impedance to lightning discharges as do ordinary coils is probably due to the fact that with very high frequency discharges the phase of the current in the two parts of the coil is not the same at the same instant, and consequently because wound in opposite directions the currents exercise a reinforcing magnetic effect instead of a mutually destructive one. On the contrary, with alternating currents of the ordinary frequency the phase is practically the same throughout the whole length of the circuit, so that the resultant self-induction is practically zero. However this may be, the fact remains that the effective impedance of these oppositely-wound coils is very high for lightning discharges and the self-induction is practically zero for currents of ordinary frequency. In consequence it is possible in an alternating system to interpose a coil between the lightning-arrester and the machine to be protected which will offer no practical disturbing effect either as to magnitude of the output or regulation of the system and which will at the same time interpose an enormous opposition to the passage of lightning discharges toward the machine to be protected.

While my invention has more advantages in an alternating-current system, it is applicable to continuous-current systems and constitutes in that connection as effective an apparatus as that in which the plain coil is used.

In Fig. 2 a two-phase system of distribution to which my invention is applied is represented. A' is a two-phase alternating-current generator and is the apparatus protected by the lightning-arrester. B' B' are the conductors for one of the currents, and B² B² are the conductors for the other. C' C² are the lightning-arresters, grounded at E' and E², respectively. D' D' and D² D² are four choking-coils, such as above described, placed directly in the line between the arresters and the generator. In this arrangement, as well as in that of Fig. 1, a current due to a static or other high-potential discharge will meet with such impedance, due to self-induction in the choking-coil, that it will go to earth by way of the lightning-arrester circuit instead of going through the coils and to the apparatus to be protected.

Figs. 5 and 6 show the choking-coil as actually constructed. In these figures, M is the base-board, and N N' are two boards between which are two coils such as are shown in Fig. 3, separated by some strong and comparatively thin insulating material O. Micanite gives very good service as a separating medium. The two coils are connected at their centers, the connecting conductor or bond passing through the micanite. The two outer terminals are connected to binding-posts P P', at which connections are made with the ends of the line-wires. It is, however, immaterial whether the connections are made as shown or whether the outer terminals are connected together and the inner ones to the binding-posts. When the parts are assembled as described, they are held in position by a bolt or bolts R.

What I claim is—

1. In a system of distribution, the combination of a lightning-arrester and a coil having portions reversely wound in close proximity to each other, said coil being placed between the lightning-arrester and the apparatus to be protected.

2. In a system of distribution having a lightning-arrester, a choking-coil between said lightning-arrester and the apparatus to be protected, and in combination therewith, said choking-coil consisting of parts whose resultant self-induction for ordinary alternating currents is practically zero.

3. In a system of distribution by alternating currents, a lightning-arrester having combined therewith a coil in which in different portions which are in inductive relation to each other, the said alternating current flows in opposite directions, said coil being in series with the line and the apparatus to be protected at a point between the lightning-arrester circuit and said apparatus.

Signed at Pittsfield, Massachusetts, this 11th day of January, 1898.

CUMMINGS C. CHESNEY.

Witnesses:
M. L. NICHOLS,
JOHN F. KELLY.